United States Patent
Cho et al.

(10) Patent No.: US 7,298,556 B2
(45) Date of Patent: Nov. 20, 2007

(54) ILLUMINATING OPTICAL SYSTEM, IMAGE DISPLAY APPARATUS USING SAME AND IMAGE DISPLAY METHOD

(75) Inventors: Kun-ho Cho, Gyeonggi-do (KR); Dae-sik Kim, Gyeonggi-do (KR); Sung-ha Kim, Cyconggi-do (KR); Hee-joong Lee, Cydonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 442 days.

(21) Appl. No.: 10/654,614

(22) Filed: Sep. 4, 2003

(65) Prior Publication Data

US 2004/0105267 A1   Jun. 3, 2004

(30) Foreign Application Priority Data

Sep. 4, 2002   (KR) .................. 10-2002-0053320

(51) Int. Cl.
*G02B 27/10* (2006.01)
*G03B 21/00* (2006.01)

(52) U.S. Cl. ..................................... 359/623; 353/31

(58) Field of Classification Search ............ 359/623, 359/626, 627, 726, 833, 850; 353/31, 33, 353/37, 84, 94, 98, 99
See application file for complete search history.

(56) References Cited

U.S. PATENT DOCUMENTS

| | | | |
|---|---|---|---|
| 4,989,948 A | | 2/1991 | Dreyer, Jr. |
| 5,379,081 A | * | 1/1995 | Kim et al. .................. 353/99 |
| 5,854,872 A | * | 12/1998 | Tai .............................. 385/133 |
| 5,993,010 A | * | 11/1999 | Ohzawa et al. ............... 353/31 |
| 6,288,815 B1 | * | 9/2001 | Lambert ..................... 359/196 |
| 6,513,935 B2 | * | 2/2003 | Ogawa ......................... 353/99 |
| 6,591,022 B2 | * | 7/2003 | Dewald ....................... 353/31 |
| 6,619,802 B2 | * | 9/2003 | Janssen et al. ................ 353/31 |
| 6,921,171 B2 | * | 7/2005 | Lee et al. ..................... 353/31 |

FOREIGN PATENT DOCUMENTS

EP   0 971 258   1/2000

\* cited by examiner

*Primary Examiner*—Alicia M Harrington
(74) *Attorney, Agent, or Firm*—Staas & Halsey LLP

(57) ABSTRACT

An illuminating optical system including a lamp light source and a reflecting mirror device. The lamp light source emits light. The reflecting mirror device having double reflecting mirror arrays formed in at least a portion thereof which at least partly adjust a divergent direction of light emitted from the lamp light source.

21 Claims, 11 Drawing Sheets

ILLUMINATING OPTICAL SYSTEM, IMAGE DISPLAY APPARATUS USING SAME AND IMAGE DISPLAY METHOD

CROSS-REFERENCE TO RELATED APPLICATIONS

This application claims the priority of Korean Patent Application No. 2002-53320, filed on Sep. 4, 2002, in the Korean Intellectual Property Office, the disclosure of which is incorporated herein in its entirety by reference.

BACKGROUND OF THE INVENTION

1. Field of the Invention

The present invention relates to an illuminating optical system and an image display apparatus using the same, and more particularly, to highly efficient illuminating optical system with high optical efficiency, an image display apparatus using the same, and an image display method.

2. Description of the Related Art

Projection type image display apparatuses focus light emitted from a light source on a microdisplay, that is, a light valve such as, for example, a liquid crystal display (LCD) or a digital microdisplay (DMD) and control the light on a pixel-by-pixel basis, thereby forming an image. The formed image is magnified and projected on a screen using a projection optical device, thereby providing a wide picture.

In the image display apparatuses, brightness of an image depends on the intensity of light condensed on the light valve.

A conventional illuminating optical system typically includes a fly eye lens or a glass rod for efficiently condensing light emitted from a lamp light source on a rectangular shaped light valve.

The aforementioned conventional illuminating optical system is not without problems. For example, when using the lamp light source as a light source, light emitted from the lamp light source is incident on the fly eye lens or the glass rod without changing the shape of the light, thereby reducing optical efficiency. More specifically, while circular light is emitted from the lamp light source, the fly eye lens or the glass rod has a rectangular shape corresponding to the rectangular shaped light valve. Thus, when the circular light emitted from the lamp light source is incident on the rectangular shaped fly eye lens or the glass rod, light loss is caused due to a difference in shapes.

For example, light emitted from the lamp light source passes through a first fly eye lens, and then is formed as a light spot on a second fly eye lens. If a size of the light spot is larger than that of the second fly eye lens, the portion beyond the size of the second fly eye lens is lost, thereby reducing the optical efficiency.

Further, if the light spot formed by the first fly eye lens is not beyond the second fly eye lens, the power of the first fly eye lens must increase and a distance between the first fly eye lens and the second fly eye lens must be short. However, in this case, an effective area of the light valve is reduced. If the effective area of the light valve is reduced, condensing light on the light valve is difficult, thereby reducing the optical efficiency.

SUMMARY OF THE INVENTION

The present invention provides an illuminating optical system with high efficiency by adjusting a divergent direction of light emitted from a lamp light source and a projection type image display apparatus using the same.

Additional aspects and/or advantages of the invention will be set forth in part in the description which follows and, in part, will be obvious from the description, or may be learned by practice of the invention.

According to an aspect of the present invention, there is provided an illuminating optical system including a lamp light source which emits light; and a reflecting mirror device having double reflecting mirror arrays formed in at least a portion thereof which at least partly adjust a divergent direction of light emitted from the lamp light source.

The reflecting mirror device may include first through fourth reflecting regions which are sequentially disposed along a rotational direction thereof, and the double reflecting mirror arrays are formed in the first and third reflecting regions or the second and fourth reflecting regions.

The reflecting mirror device may adjust a divergent direction of light emitted from the lamp light source so that the light is converted into elliptical or near-elliptical light.

An angle of a mirror surface of the double reflecting mirror arrays may be 45°.

According to another aspect of the present invention, there is provided an image display apparatus including an illuminating optical system which includes a lamp light source and a reflecting mirror device having double reflecting mirror arrays formed in at least a portion thereof for at least partly adjusting a divergent direction of light emitted from the lamp light source; and a light valve which controls light emitted from the lamp light source and then reflected by the reflecting mirror device on a pixel-by-pixel basis according to an input image signal and form a color image.

The image display apparatus may further comprise a light mixture device and a relay lens which are disposed between the reflecting mirror device and the light valve.

The light mixture device may be a glass rod. The image display apparatus may further comprise a condensing lens which condenses light passed through the reflecting mirror device and inputs the light to the glass rod.

The light mixture device may include two fly eye lenses.

The image display apparatus may further comprise a colored light separator, which separates light emitted from the lamp light source according to wavelength, to form a color image.

The colored light separator may include three or more dichroic filters.

The image display apparatus may further include a spiral lens, in which lens cells are formed spirally in order to obtain the effect of rectilinear motion of a lens cell array due to the rotation of the spiral lens cell array, so that a scrolling operation of the light emitted from the lamp light source is performed.

According to still another aspect of the present invention, there is provided an image display apparatus projection system including an illuminating optical system and a light mixing section. The illuminating optical system includes a light generating section which emits a light beam and a light beam shape adjusting section including a reflecting mirror device which adjusts the shape of the light beam.

According to yet another aspect of the present invention, there is provided an image display apparatus including an illuminating optical system, a light valve, a scrolling unit, a colored light separator, and a pair of fly-eye lenses. The illuminating optical system includes a light source which emits light disposed at a light emitting end of a light path and a light shape adjuster disposed on the light path which adjusts the shape of the light beam emitted by the light source so as to output a shape adjusted light beam. The light valve forms a color image by turning pixels one of on and off according to an input image signal and disposed at an image forming end of the light path. The scrolling unit is disposed on the light path between the illuminating optical device and the light valve, receives the shape adjusted light beam, and scrolls the shape adjusted light beam. The colored light separator separates the shape adjusted light beam emitted from the scrolling unit into color beams according to wavelength. The pair of fly-eye lenses is disposed on the light path between the colored light separator and the light valve, receives the scrolling color beams, focuses the color beams onto a relay lens disposed on the light path between the pair of fly-eye lenses and the light valve, and transmits to the light valve received color beams from the pair of fly-eye lenses. The scrolling causes the color beams to be received by the light valve at different portions thereof.

According to still another aspect of the present invention, there is provided a method of displaying an image, including: emitting a light beam; adjusting a divergent angle of the light beam so as to adjust a shape thereof; focusing the shape adjusted light beam onto a light valve and turning pixels of the light valve one of on and off according to a received image signal so as to form a color image; magnifying the color image; and projecting the magnified color image onto a screen.

According to yet another aspect of the present invention, there is provided a method of displaying an image, including: emitting a light beam; adjusting a divergent angle of the light beam so as to adjust a shape thereof; separating the shape adjusted light beam into a plurality of color beams according to wavelength; focusing the color beams onto a light valve and turning pixels of the light valve one of on and off according to a received image signal so as to form a color image; magnifying the color image; and projecting the magnified color image onto a screen.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
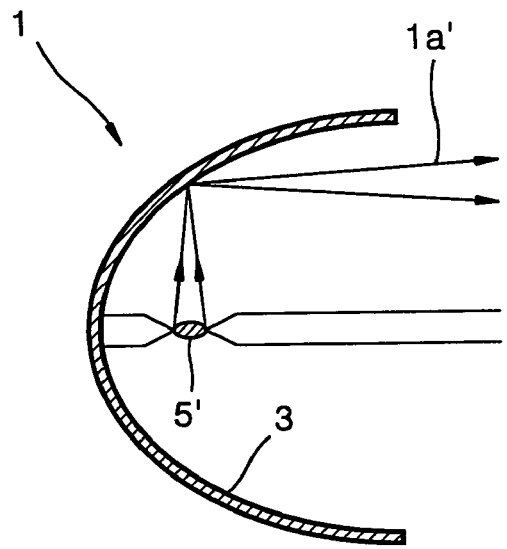
FIG. 1 schematically shows a conventional lamp light source used as a light source of a projection type image display apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIG. 1 which schematically shows a lamp light source 1 used as a light source of a projection type image display apparatus, the lamp light source 1 includes a reflecting mirror 3 for traveling light in only one direction. For example, the lamp light source 1 produces light by arc discharge. A portion of light generated in an arc discharge region 5' is incident on the reflecting mirror 3, and the reflecting mirror 3 reflects the light incident thereon so that the reflected light travels in only one direction.

The lamp light source 1 emits approximate parallel light or approximate converging light according to the shape of the reflecting mirror 3. For example, if the reflecting mirror 3 is a parabolic mirror, the lamp light source 1 emits approximate parallel light. If the reflecting mirror 3 is an elliptical mirror, the lamp light source 1 emits approximate converging light.

The arc discharge region 5' has an approximate elliptical shape, and light generated in the arc discharge region 5' is spread in all directions. Thus, the arc discharge region 5' operates as an elliptical luminous body 5.

Figure 2:
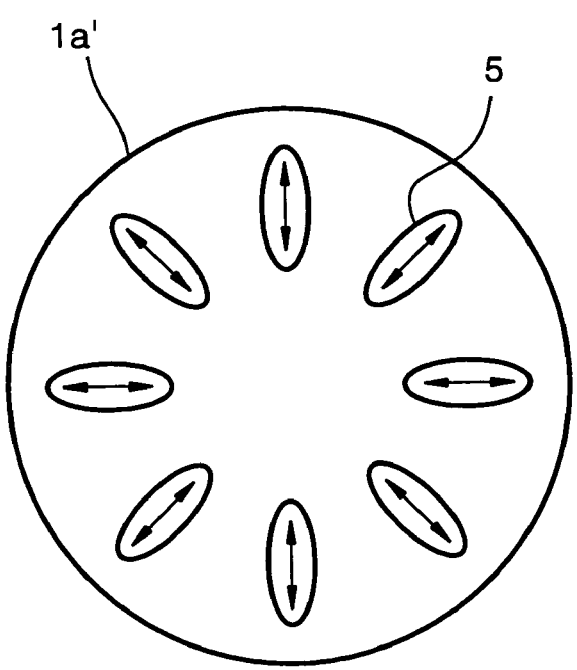
FIG. 2 shows approximate circular light emitted from the lamp light source of FIG. 1, in which a plurality of luminous bodies having a divergent angle distribution diverging in an elliptical shape are distributed in an axis symmetric direction.
Figure 3:
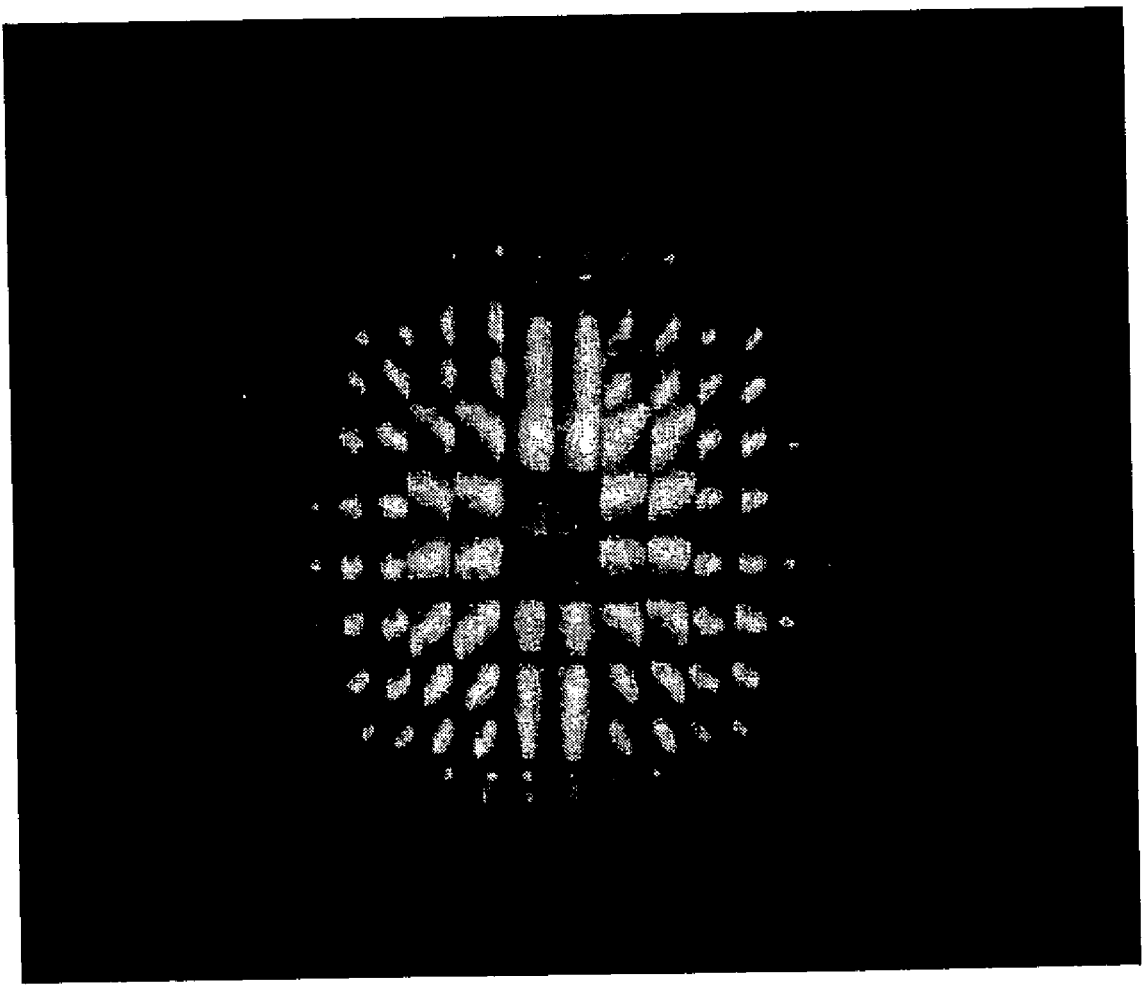
FIG. 3 shows a divergent angle distribution in the axis symmetric direction and a light intensity distribution of the luminous bodies in a case where light emitted from the lamp light source of FIG. 1 and then passed through a polarization converting system is incident on a fly eye lens.

Consequently, the lamp light source 1, as shown in FIGS. 2 and 3, emits approximately or substantially circular light 1a' in which a plurality of luminous bodies 5 having a divergent angle distribution diverging in an elliptical shape are radially distributed in an axis symmetric direction. The disposition of the luminous bodies 5 in the axis symmetric direction indicates that the luminous bodies 5 are disposed symmetrically with respect to an optical axis of the circular light 1a'. A main divergent direction of the luminous bodies 5 is a major axis direction of the elliptical shape. The major axes of the luminous bodies 5 are distributed in the axis symmetric direction. In FIG. 2, an arrow indicated within the luminous bodies 5 denotes the main divergent direction, that is, the major axis direction.

As shown in FIGS. 2 and 3, a divergent angle and light intensity of the luminous bodies 5 are distributed in the axis symmetric direction due to arc size generated by arc discharge in the lamp light source 1. A relatively large portion and a relatively small portion of the divergent angle of the luminous bodies 5 are approximately in the ratio of 2.5:1.

FIG. 3 shows the divergent angle distribution and the light intensity distribution of the luminous bodies 5 in a case where light emitted from the lamp light source 1 and then passed through a polarization converting system (not shown) is incident on a fly eye lens. In FIG. 3, each of the unit cells corresponds to a region of a one-polarizing beam splitter of the polarization converting system, and the two unit cells correspond to each lens cell of the fly eye lens. Here, the polarization converting system aligns the polarization direction of the circular light 1a' (shown in FIG. 1) emitted from the lamp light source 1 (shown in FIG. 1) in one direction. Since such a polarization converting system is known to those of ordinary skill in the art, a description thereof will be omitted.

Figure 4:
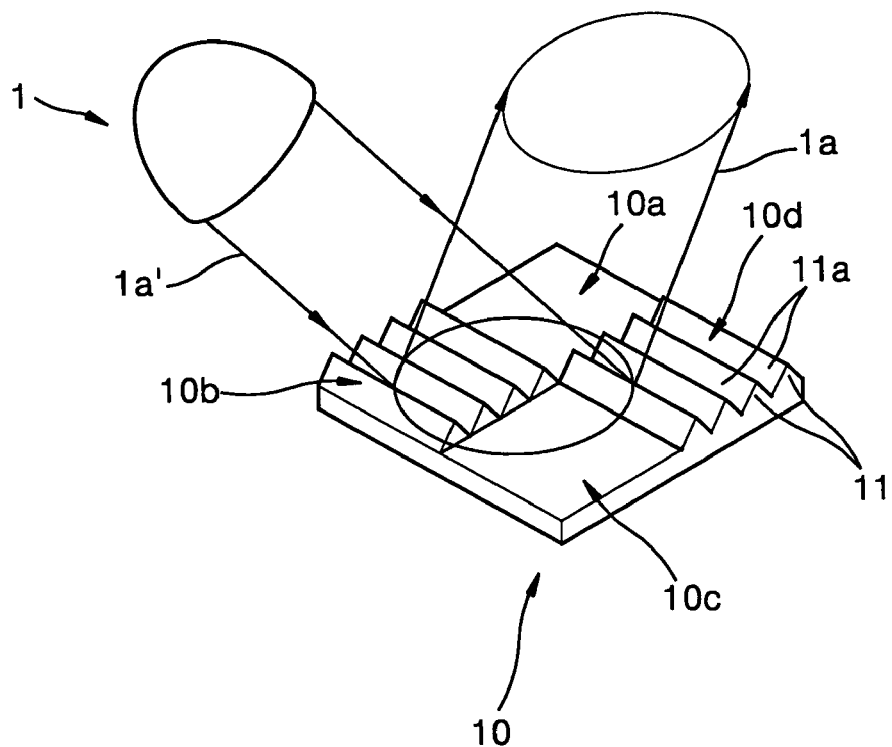
FIG. 4 is a perspective view of portions of an illuminating optical system showing the operation of a reflecting mirror device according to an embodiment of the present invention.

In consideration of the fact that the approximate circular light 1a', in which the plurality of elliptical luminous bodies 5 having the divergent angle distribution diverging in the elliptical shape are distributed in the axis symmetric direction, is emitted from the lamp light source 1, the illuminating optical system with high efficiency according to an embodiment of the present invention is formed to adjust the divergent direction of the circular light 1a' so that the circular light 1a' is converted into elliptical light or near-elliptical light 1a (shown in FIG. 4). Consequently, the elliptical light is efficiently matched with components of an optical system that uses the illuminating optical system with high efficiency according to the present invention, thereby increasing the optical efficiency of the optical system.

FIG. 4 is a perspective view of portions of the illuminating optical system showing the operation of a reflecting mirror device according to an embodiment of the present invention Referring to FIG. 4, the illuminating optical system according to the present invention includes the lamp light source 1 and a reflecting mirror device 10 having double reflecting mirror arrays 11 which are formed in at least a portion of the reflective mirror device 10.

The lamp light source 1, as shown in FIGS. 1 through 3, emits circular light 1a' in which the plurality of elliptical luminous bodies 5 having the divergent angle distribution with an elliptical shape are radially distributed in the axis symmetric direction.

The reflecting mirror 3 of the lamp light source 1 is a parabolic mirror that emits parallel light. However, it is to be understood that the reflecting mirror may be of other shapes.

The double reflecting mirror arrays 11 are formed in at least a portion of the reflecting mirror device 10 in order to adjust the divergent direction of at least a portion of the circular light 1a' and thus increase the optical efficiency of the system.

The reflecting mirror device 10 includes first through fourth reflecting regions 10a, 10b, 10c, and 10d which are disposed in a rotational direction thereof. The double reflecting mirror arrays 11 are formed in the second and fourth reflecting regions 10b and 10d (or the first and third reflecting regions 10a and 10c). In FIG. 4, the double reflecting mirror arrays 11 are formed in the second and fourth reflecting regions 10b and 10d, and the first and third reflecting regions 10a and 10c are flat or substantially flat mirror surfaces.

The rotational direction may be the counterclockwise direction or the clockwise direction. Since the first through fourth reflecting regions 10a, 10b, 10c, and 10d are disposed in the rotational direction, the first through fourth reflecting regions 10a, 10b, 10c, and 10d have a 2×2 matrix disposition, and the disposition order of the first through fourth reflecting regions 10a, 10b, 10c, and 10d is identified with the rotational direction.

Figure 5:
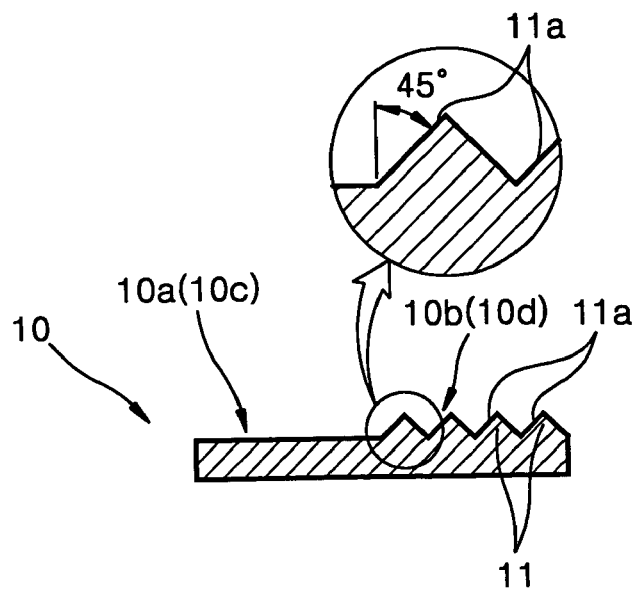
FIG. 5 is a cross-sectional view of the reflecting mirror device of FIG. 4.

The mirror surfaces 11a of the double reflecting mirror arrays 11, as shown in FIG. 5, make an angle of about 45° with a plane of the reflecting mirror device 10, for example, a surface of the first and third reflecting regions 10a and 10c in which the double reflecting mirror arrays 11 are not formed. Thus, the mirror surfaces 11a are of a so-called "sawtooth" configuration. However, it is to be understood that other configurations are possible.

When the reflecting mirror device 10 according to an embodiment of the present invention as above described is used, it is possible that the major axis direction, that is, the divergent direction of the luminous bodies 5 having the divergent angle distribution diverging in the elliptical shape are distributed in the axis symmetric direction, is somewhat aligned toward one direction using the reflecting mirror device 10.

Figure 6:
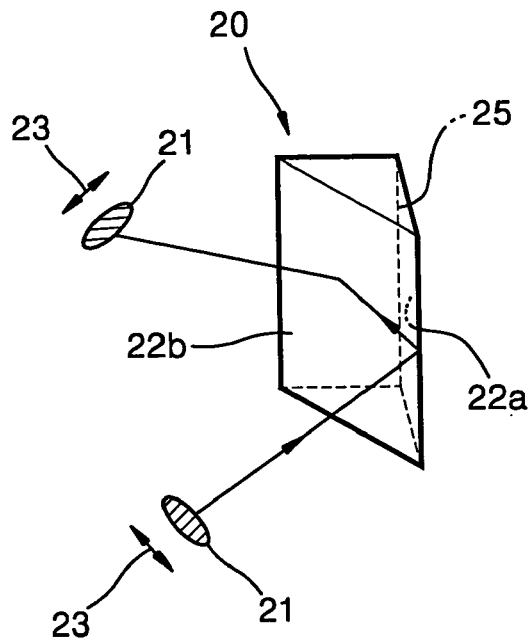
FIG. 6 shows rotation of elliptical light in a double reflecting mirror.

FIG. 6 shows a rotation of elliptical light 21 in a double reflecting mirror 20.

As shown in FIG. 6, if an axis direction 23 of the elliptical light 21 is not identical to the direction of an axis 25 dividing mirror surfaces 22a and 22b of the double reflecting mirror 20, the elliptical light 21 is incident on the double reflecting mirror 20 and reflected twice by the double reflecting mirror 20 so that the axis direction 23 of the elliptical light 21 is rotated two times the angular difference between the axis direction 23 and the direction of the axis 25.

Figure 7A:
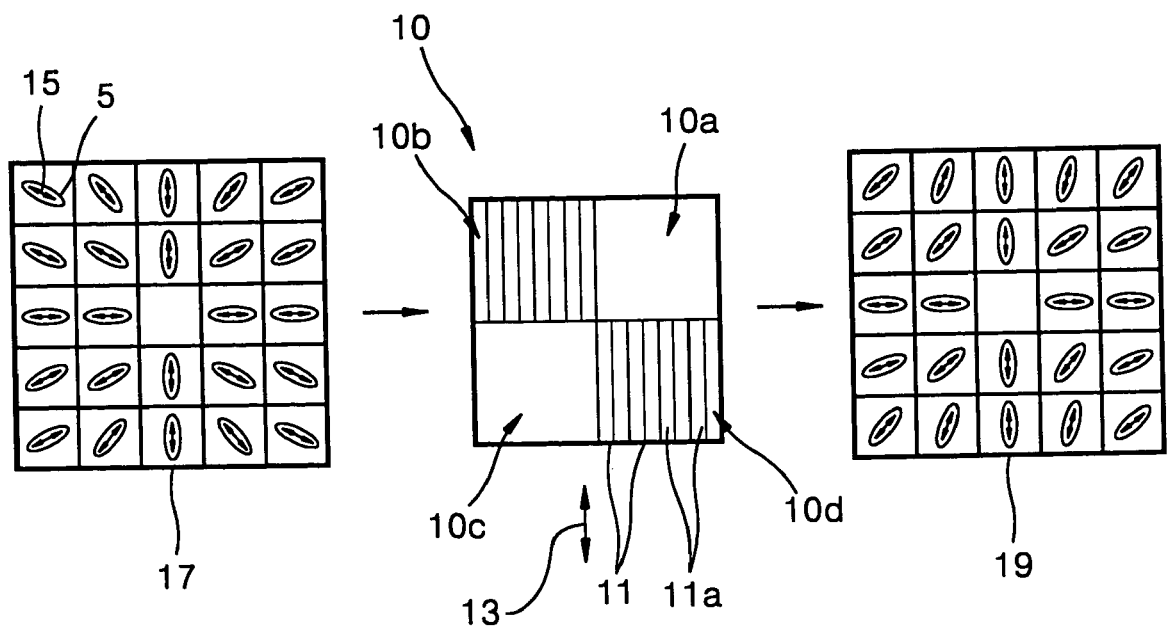
FIG. 7A shows the axis rotation of the axis of a divergent angle when two cylindrical lens arrays are installed in front of and behind a reflecting mirror device of FIG. 4.
Figure 7B:
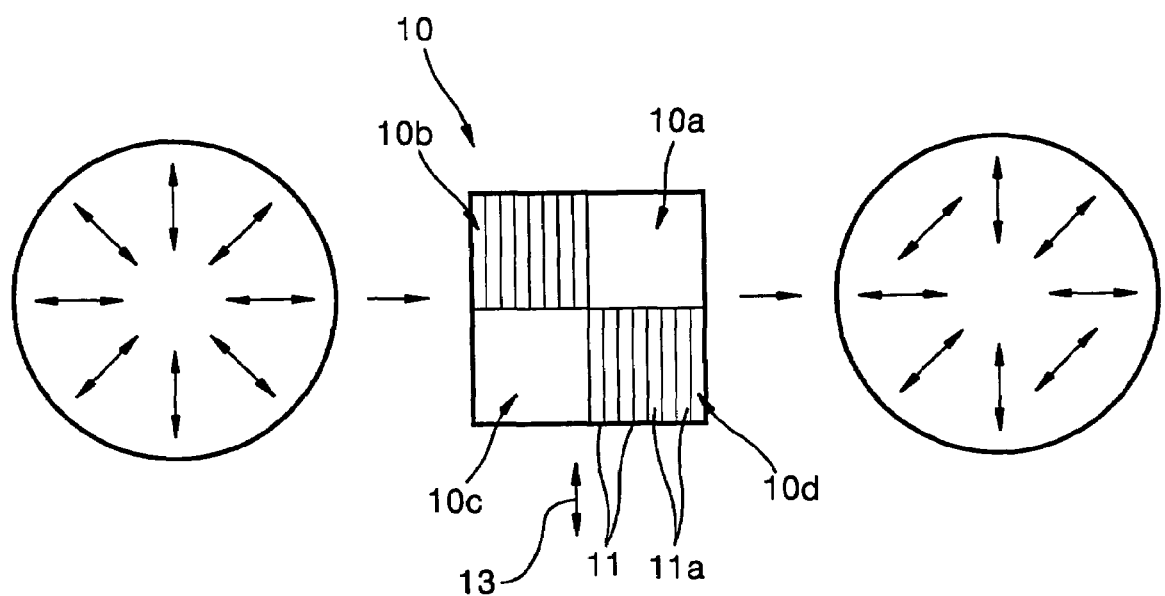
FIG. 7B shows a divergent angle distribution of light emitted from a lamp light source and a divergent angle distribution of light aligned by a reflecting mirror device of FIG. 4.

Accordingly, when a longitudinal direction 13 of the double reflecting mirror array 11, which is in the reflecting mirror device 10 according to an embodiment of the present invention as shown in FIGS. 7A and 7B, is in the middle between a direction for aligning an axis of a divergent angle of light and an axis direction of the elliptical divergent angle of the luminous body 5 having the elliptical divergent angle distribution, then a portion of the divergent angle distribution in the axis symmetric direction is aligned in one direction so that a shape of light passing through the reflecting mirror device 10 may be elliptical or near to elliptical.

FIG. 7A shows the rotation of the axes of the divergent angles of the light when cylindrical lens arrays 17 and 19 are installed in front of and behind the reflecting mirror device 10 according to the present invention.

FIG. 7B shows a divergent angle distribution of the light emitted from the lamp light source 1 (shown in FIG. 4) and a divergent angle distribution of light aligned by the reflecting mirror device 10 (shown in FIG. 4) according to an embodiment of the present invention.

Figure 8:
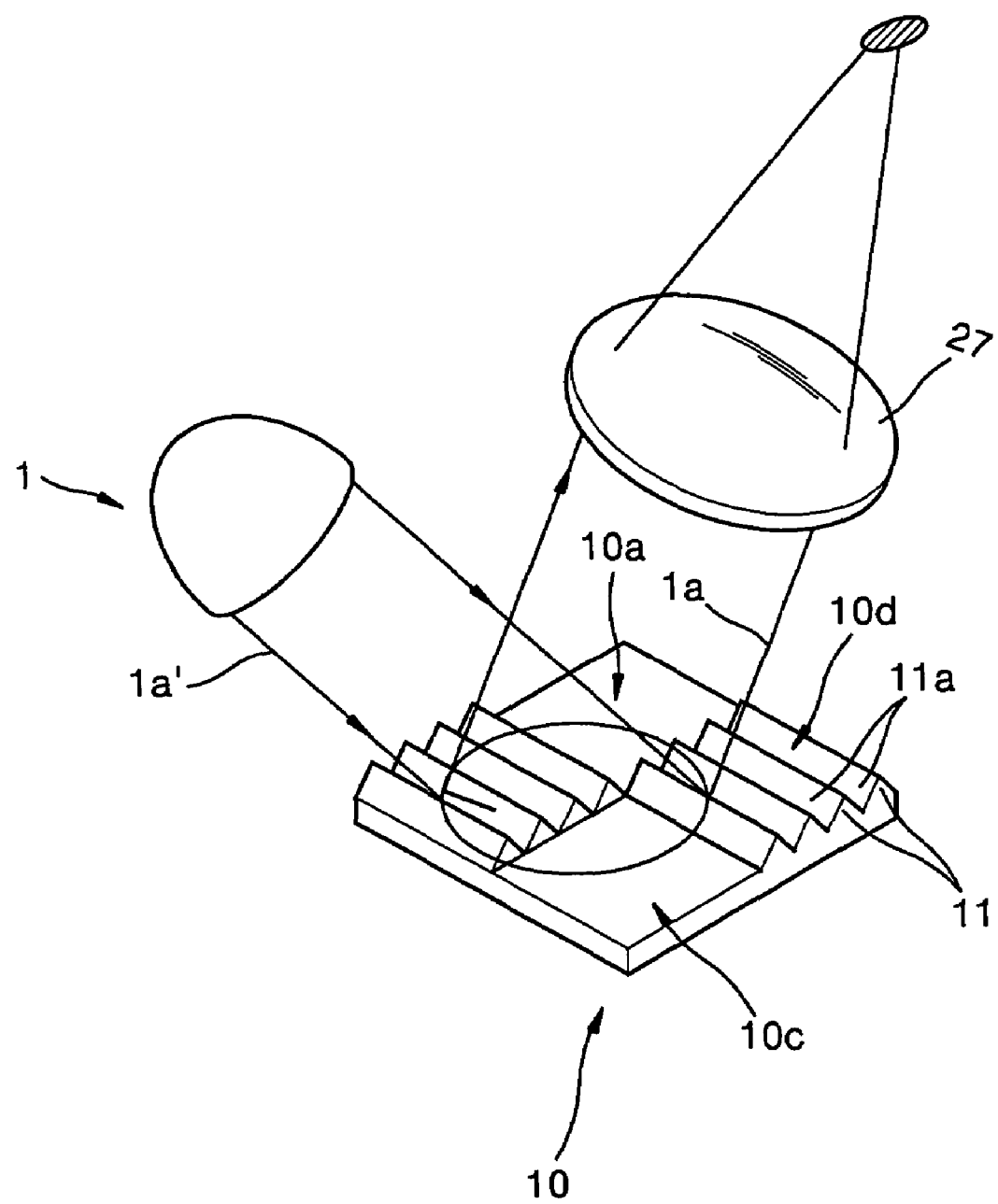
FIG. 8 is a diagram that shows that the reflecting mirror device of FIG. 4 converts circular light emitted from a lamp light source into elliptical light or near-elliptical light.

When the divergent angle of the light 1a' emitted from the lamp light source 1 is adjusted by the reflecting mirror device 10, a light spot having a longish elliptical shape can be formed as shown in FIG. 8. FIG. 8 is a diagram confirming that the reflecting mirror device 10 according to an embodiment of the present invention converts the circular light emitted from the lamp light source 1 into the elliptical light or near-elliptical light 1a. In FIG. 8, light 1a passing through the reflecting mirror device 10 is condensed by a predetermined lens 27 and forms a light spot.

Since the circular light 1a' emitted from the lamp light source 1 is converted into the elliptical light or near-elliptical light 1a by the illuminating optical system according to an embodiment of the present invention, the elliptical light 1a is efficiently matched with components of a projection type image display apparatus that have a rectangular shape, for example, a fly eye lens or a glass rod, thereby increasing the optical efficiency.

Thus, the projection type image display apparatus is disposed such that the major axis direction of the light 1a in which the divergent direction is adjusted by the reflecting mirror device 10 and converted into elliptical light or near-elliptical light is identical to the direction of a wide width of any component of the illuminating optical system or the projection type image display apparatus, for example, a rectangular fly eye lens or a glass rod.

Figure 9:
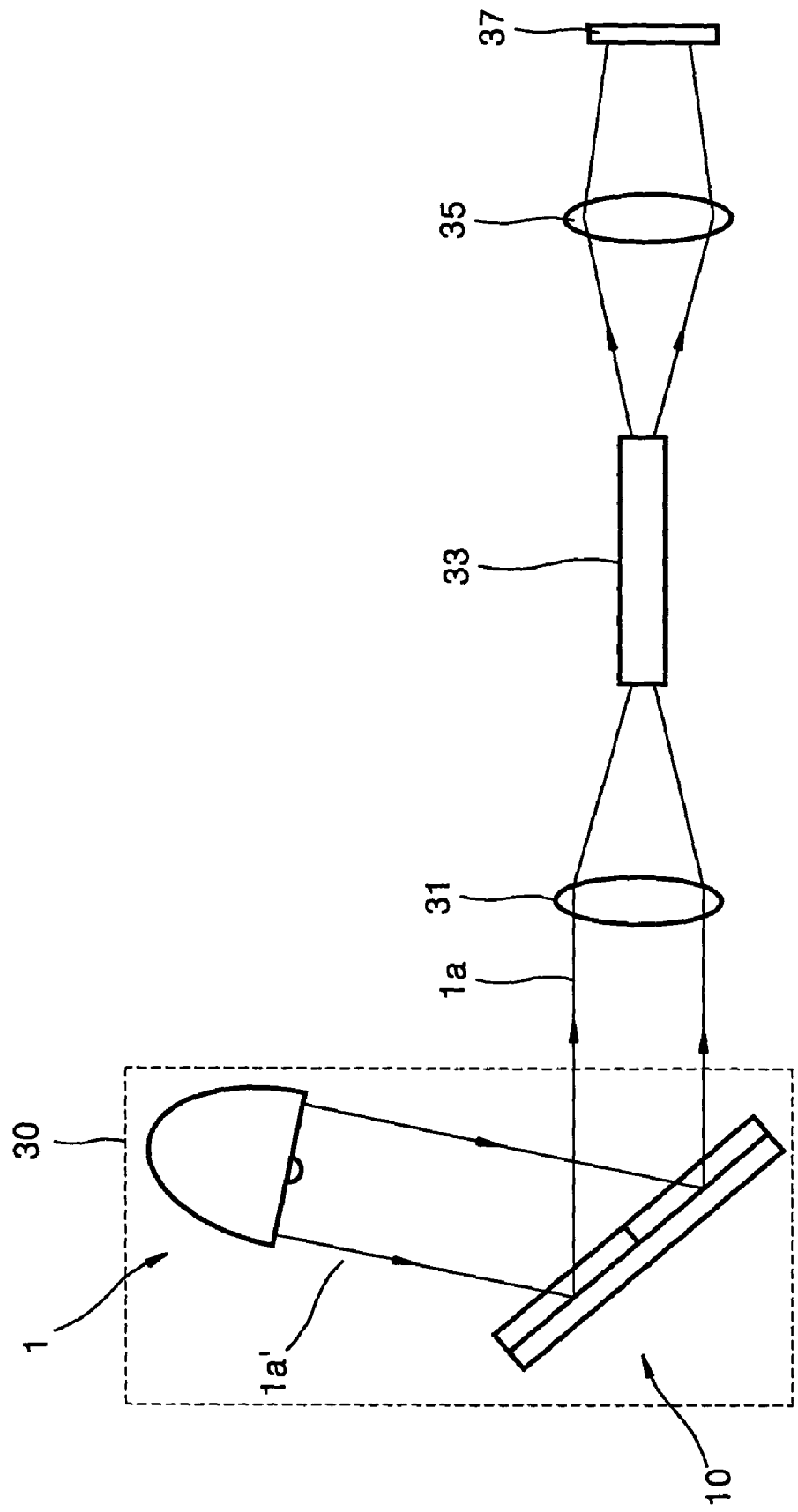
FIG. 9 shows a projection type image display apparatus using an illuminating optical system with high efficiency according to a first embodiment of the present invention.

FIG. 9 shows a projection type image display apparatus using an illuminating optical system with high efficiency according to a first embodiment of the present invention.

Referring to FIG. 9, the projection type image display apparatus includes an illuminating optical system 30, a glass rod 33 used as a light mixture device, and a light valve 37. The projection type image display apparatus further includes a condensing lens 31 and a relay lens 35. As described above, the illuminating optical system 30 includes a lamp light source 1 and a reflecting mirror device 10 for adjusting a divergent direction of light emitted from the lamp light source 1.

Substantially circular light 1a' emitted from the lamp light source 1 is incident on the reflecting mirror device 10. The divergent direction of the incident light is adjusted into elliptical or substantially elliptical light 1a and reflected toward a condensing lens. After the condensing lens 31 condenses light reflected by reflecting mirror device 10, the light is incident on the glass rod 33.

At this time, since the illuminating optical system 30 adjusts a divergent direction of the circular light 1a' emitted from the lamp light source 1 so that the circular light 1a' is converted into the elliptical or near-elliptical light 1a, the condensing lens 31 condenses the converted elliptical light 1a and a long elliptical light spot is formed.

The illuminating optical system 30 is optically aligned such that the major axis of the elliptical light spot is formed in line with the long side (the longitudinal axis) of an incident surface of the glass rod 33. In this case, the elliptical light 1a emitted from the illuminating optical system 30 is efficiently matched with the glass rod 33, thereby increasing the optical efficiency. However, it is to be understood that other orientations of the illuminating optical system 30 and the glass rod 33 are possible.

The glass rod 33 makes the distribution of the incident light 1a uniform and then outputs the uniform light. The relay lens 35 transfers the uniform light to the light valve 37.

The light valve 37 controls the incident light on a pixel-by-pixel basis according to an input image signal and forms an image.

The image formed by the light valve 37 is magnified by a projection lens unit (not shown) and projected on a screen (not shown).

As described above, the structure of the optical system which forms an image and projects the formed image may be modified variously. Since an image forming/projecting part used in the projection type image display apparatus that includes a light mixture device is known to those of ordinary skill in the art, a description thereof will be omitted.

Also, the structure of other optical components except for the illuminating optical system 30 of the projection type image display apparatus according to the first embodiment of the present invention and the light mixture device may be modified variously.

Figure 10:
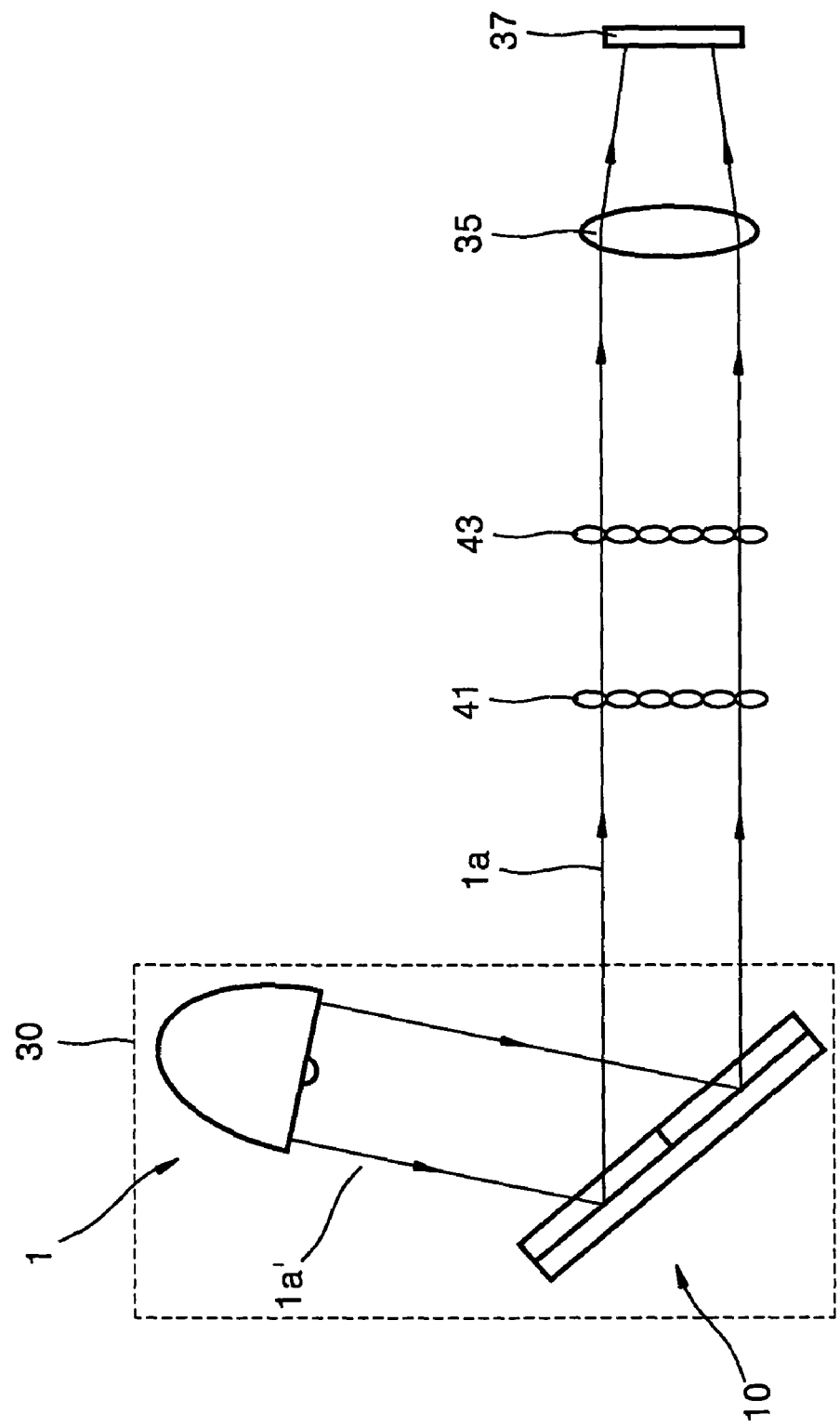
FIG. 10 shows a projection type image display apparatus using an illuminating optical system with high efficiency according to a second embodiment of the present invention.

FIG. 10 shows a projection type image display apparatus using a highly efficient illuminating optical system according to a second embodiment the present invention.

The projection type image display apparatus according to the second embodiment of the present invention has the same optical structure as that of the projection type image display apparatus according to the first embodiment of the present invention shown in FIG. 9, except that two fly eye lenses 41 and 43 instead of a glass rod are used as a light mixture device. In FIG. 10, the same reference numerals as those in FIG. 9 represent the same elements, and thus their descriptions will be omitted.

When the fly eye lenses 41 and 43 are used as a light mixture device in the second embodiment of the present invention, a section area of the fly eye lenses 41 and 43 is greater than that of the glass rod used as a light mixture device in the first embodiment shown in FIG. 9, and thus a condensing lens 31 (refer to FIG. 9) can be advantageously omitted.

In order to efficiently match light emitted from the illuminating optical system 30 with the fly eye lenses 41 and 43 used as a light mixture device, the illuminating optical system 30 is optically aligned such that the major axis of the elliptical or near-elliptical light 1a emitted from the illuminating optical system 30 is formed in a line with a long side of the fly eye lenses 41 and 43. However, it is to be understood that other orientations of the illuminating optical system 30 and the fly eye lenses 41 and 43 are possible.

The optical structure of the projection type image display apparatus according to the second embodiment of the present invention which forms an image on a light valve 37 and projects the formed image may be variously modified.

Figure 11:
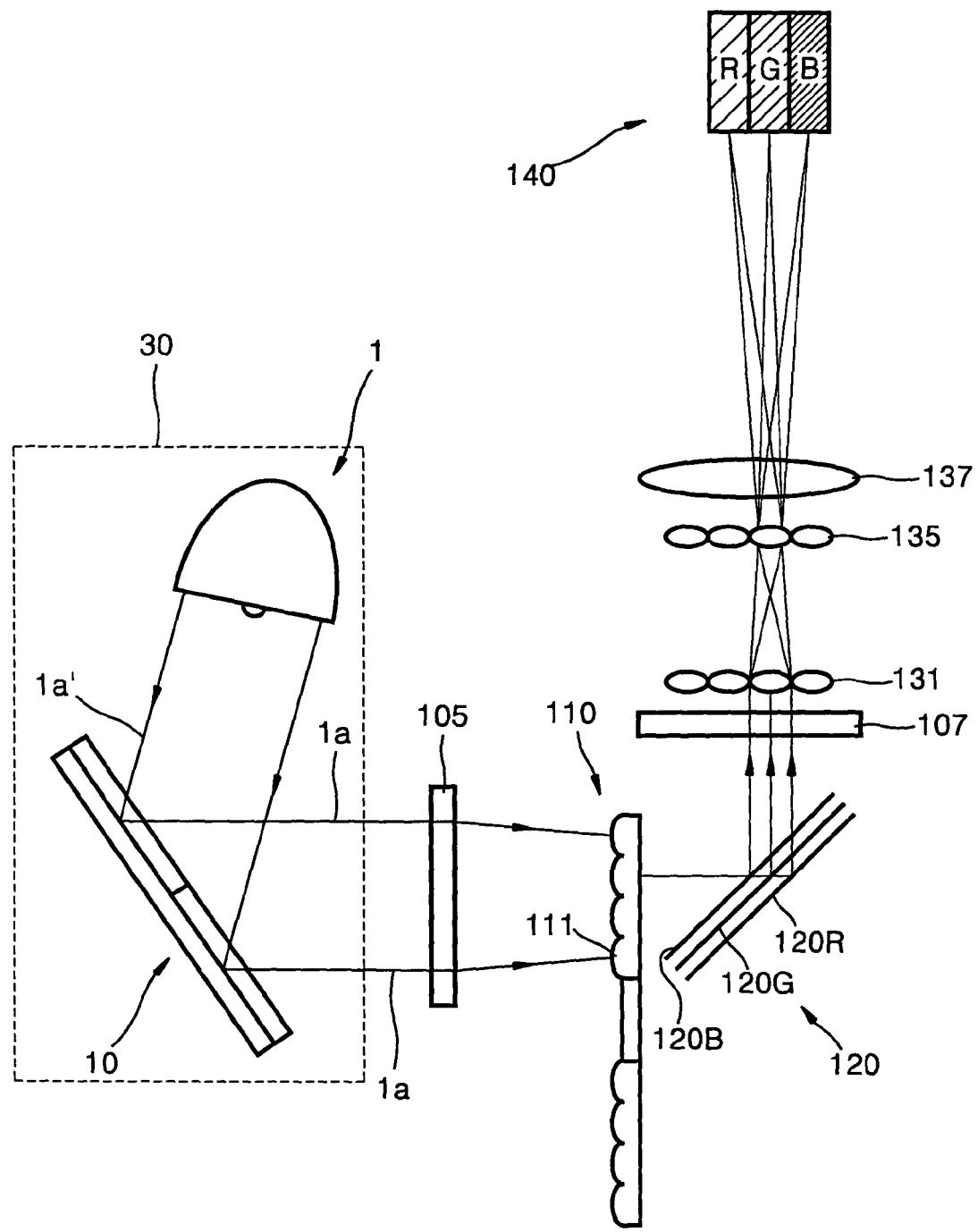
FIG. 11 shows a projection type image display apparatus using an illuminating optical system with high efficiency according to a third embodiment of the present invention.

The illuminating optical system according to the present invention, as shown in FIG. 11, can be applied to a single-panel color image display apparatus including a colored light separator having three or more dichroic filters.

FIG. 11 shows a single-panel color image display apparatus using a highly efficient illuminating optical system according to a third embodiment of the present invention.

Referring to FIG. 11, the single-panel color image display apparatus according to the third embodiment of the present invention includes an illuminating optical system 30, a colored light separator 120 which separates light emitted from a lamp light source 1 according to color (i.e., by wavelength λ ranges corresponding to different colors), and a light valve 140 which controls incident light on a pixel-by-pixel basis according to an input image signal and forms a color image. That is, the single-panel color image display apparatus forms a color image using the single light valve 140.

As described above, the illuminating optical system 30 adjusts a divergent direction of light 1a' emitted from the lamp light source 1 by a reflecting mirror device 10 in which double reflecting mirror arrays 11 are formed in a portion thereof so that the circular light 1a' is converted into elliptical or near-elliptical light 1a.

The colored light separator 120 includes three or more dichroic filters to separate the light 1a emitted from the illuminating optical system 30 according to wavelength. Specifically, the colored light separator 120 includes first, second, and third dichroic filters 120B, 120G, and 120R of a reflective type. The dichroic filters 120B, 120G, and 120R reflect a blue light B, a green light G, and a red light R, respectively, and transmit other colored light.

When light emitted from the illuminating optical system 30, which light is white (i.e., comprising a broad spectrum of wavelengths), is incident on the colored light separator 120 having the first, second, and third dichroic filters 120B, 120G, and 120R, the first dichroic filter 120B reflects a blue light B from the incident white light and transmits remaining light. The second dichroic filter 120G reflects a green light G from the light transmitted by the first dichroic filter 120B and transmits a remaining beam, that is, a red light R. The third dichroic filter 120R reflects the red light R transmitted by the second dichroic filter 120G.

Here, a disposition order of the first, second, and third dichroic filters 120B, 120G, and 120R can be changed variously.

The first, second, and third dichroic filters 120B, 120G, and 120R are disposed such that the blue light B, the green light G, and the red light R separated by the colored light separator 120 are incident on the same lens cell of a first fly eye lens 131 without color mixture among the B, G, and R colored light.

In FIG. 11, the first, second, and third dichroic filters 120B, 120G, and 120R of the colored light separator 120 are disposed in parallel to one another. However, it is to be understood that other arrangements are possible.

The single-panel color image display apparatus according to the third embodiment of the present invention is shown to include an optional a structure for using a color scrolling technique. Using the color scrolling technique, the single-panel color image display apparatus according to the present invention can have the same optical efficiency as that of a three-panel color image display apparatus.

According to the color scrolling technique, white light is separated into a plurality of colored light beams and the plurality of colored light beams are simultaneously sent at different locations on a light valve, thereby forming a plurality of color bars and the color bars move at a constant speed in a particular method so that an image is formed after all the plurality of color bars for each pixel reach the light valve.

One example of such a scrolling arrangement includes a spiral lens 110 in order to perform a color scrolling.

First and second fly eye lenses 131 and 135 are further provided along the optical path between the spiral lens 110 and the light valve 140. Also, a relay lens 137 is further provided between the second fly eye lens 135 and the light valve 140.

Figure 12:
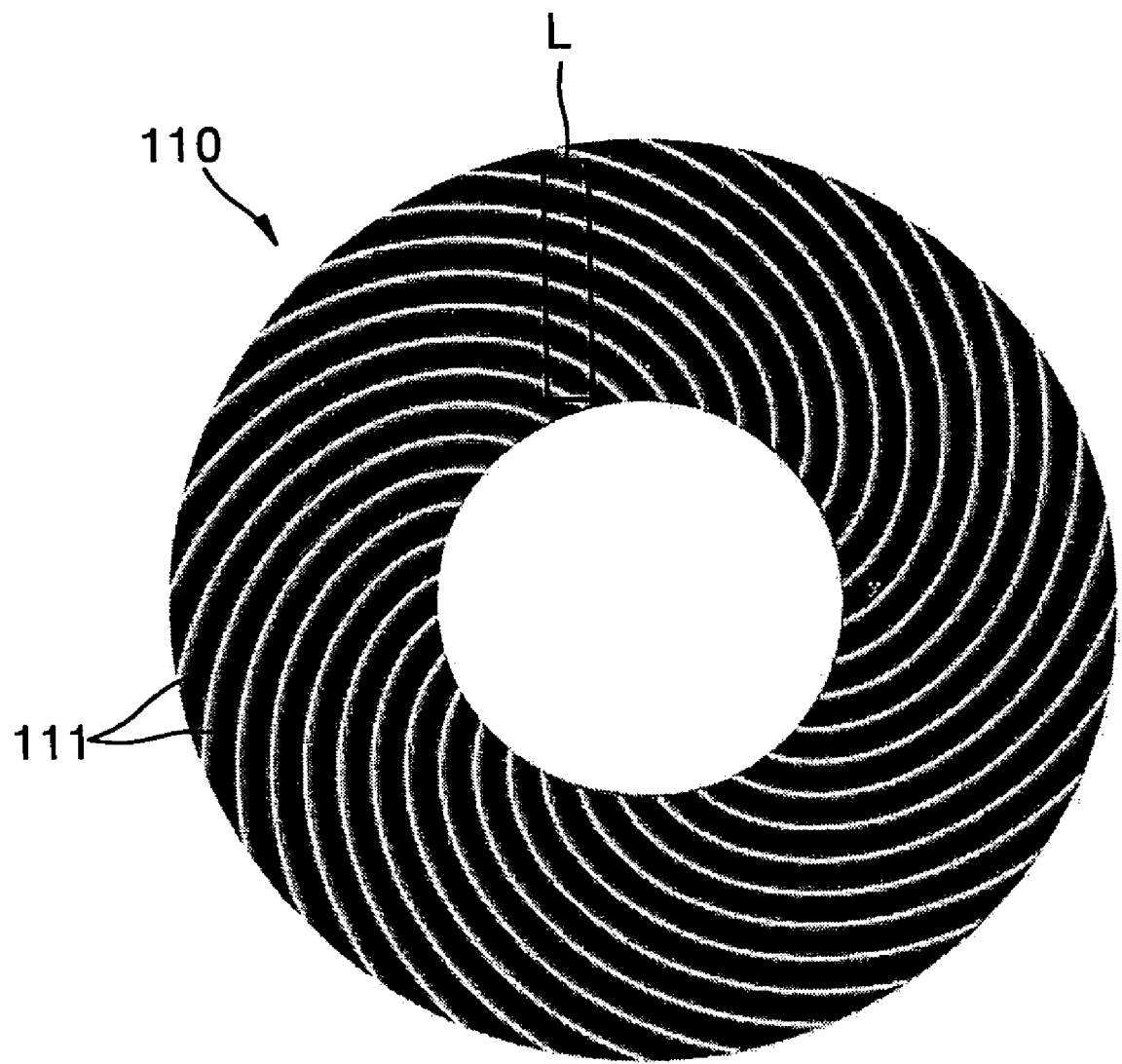
FIG. 12 schematically shows the structure of a spiral lens usable in the projection type image display apparatus of FIG. 11.

The spiral lens 110, as shown in FIG. 12, has a disc structure in which the array of lens cells 111 is spirally formed in order to obtain the effect of a rectilinear motion of the lens array 111 during the rotation of the spiral lens 110. That is, the rotation of the spiral lens 110 simulates rectilinear motion of the scrolling arrangement. As shown in FIG. 12, the lens cells 111 are formed at regular intervals and have the same cross-section. However, it is to be understood that other configurations are possible.

Figure 13:
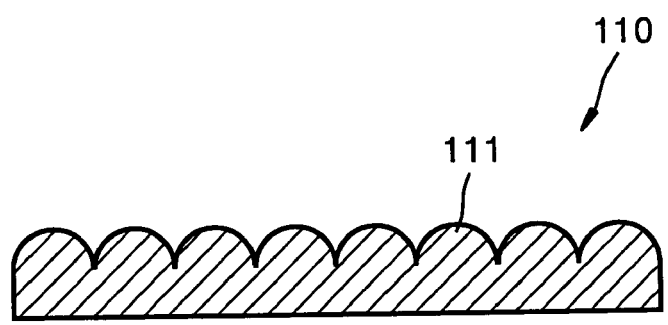
FIG. 13 is a cross-sectional view of the spiral lens of FIG. 12 showing the lens cells thereof.

For example, the lens cells 111 of the spiral lens 110, as shown in FIG. 13, may be cylindrical lens cells whose cross-section shapes are arcs. Alternatively, the lens cells 111 of the spiral lens 110 can be either a diffractive optical element or a hologram optical element.

Each of the lens cells 111 of the spiral lens 110 operates as a condensing lens for condensing the light 1a emitted from the illuminating optical system 30.

When the spiral lens 110 having the spiral lens cell array is rotated, the rotation of the spiral lens cell array makes the effect of a rectilinear motion of the lens array so that color scrolling is performed.

In other words, since the array of lens cells 111 is formed spirally, when the spiral lens 110 rotates at a constant speed, it can be seen from the viewpoint of a light beam passing through a predetermined location of the spiral lens 110 that the effect generated when a cylindrical lens array continuously moves upward or downward at a constant speed is obtained from the spiral lens cell array. Here, when a light beam L passing through the spiral lens 110 has a narrow width, the effect of the light beam L passing through the cylindrical lens array that moves rectilinearly can be obtained from the light beam passing through the spiral lens 110.

Accordingly, as the spiral lens 110 rotates at a constant speed, the beams of colored light separated by the colored light separator 120 are repeatedly scrolled according to the rotation of the spiral lens 110 so that color bars formed on the light valve 140 are scrolled.

At this time, in a case where the spiral lens 110 is provided as described above, since the spiral lens 110 continuously rotates in one direction without changing the rotational direction so that the color scrolling is performed, continuity and consistency of the color scrolling can be guaranteed. In addition, since color bars are scrolled using the single spiral lens 110, the scrolling speed of the color bars is advantageously kept constant.

Here, the number of spiral lens cells 111 on the spiral lens 110 or the rotation speed of the spiral lens 110 can be adjusted to synchronize with the operating frequency of the light valve 140.

For example, if the operating frequency of the light valve 140 is high, more lens cells are included so that the scrolling speed can be adjusted to be faster while keeping the rotation speed of the spiral lens 110 constant, or the scrolling speed can be adjusted to be faster by increasing the rotation frequency of the spiral lens 110 without changing the number of spiral lens cells 111.

Although the single-panel color image display apparatus according to the third embodiment of the present invention shown in FIG. 11 includes the single spiral lens 110, two spiral lenses may be provided. In a case where the single-panel color image display apparatus includes two spiral lenses, the two spiral lenses are installed on the same driving axis so that color scrolling can be performed. Thus, the speed of the color scrolling can be kept constant.

In a case where the dichroic filters 120B, 120G, and 120R of the colored light separator 120 are parallel to one another, the spiral lens 110, as shown in FIG. 11, is disposed between the illuminating optical system 30 and the colored light separator 120 so that light condensed by the spiral lens 110 is separated by the colored light separator 120 and then, the separated color beams are not mixed due to difference in the lengths of optical paths of the color beams caused by the selective reflection of the dichroic filters 120B, 120G, and 120R, and are incident on the first fly eye lens 131. However, it is to be understood that other arrangements are possible.

For example, dichroic filters 120B, 120G, and 120R of the colored light separator 120 may be disposed aslant with respect to one another and the spiral lens 110 may be disposed between the colored light separator 120 and the light valve 140.

Lens cells of each of the first and second fly eye lenses 131 and 135 match with each other in a one-to-one correspondence. Further, the lens cells of the first and second fly eye lenses 131 and 135 match the lens cells 111 of the spiral lens 110 in a one-to-one correspondence.

As illustrated in FIG. 11, the first fly eye lens 131 is disposed on a focal surface of the spiral lens 110 in order to condense the colored light which passes through the spiral lens 110 and are separated by the colored light separator 120 without color mixture among the colored light. However, it is to be understood that the fly eye lens 131 may be positioned elsewhere.

In this case, the color beams, which are condensed by the lens cells 111 of the spiral lens 110 that functions as a condensing lens and separated by the dichroic filters 120B, 120G, and 120R of the colored light separator 120, have different lengths of their optical paths due to the dichroic filters 120B, 120G, and 120R which are separated from one another, thereby focusing at different locations of the lens cell of the first lens array 131.

Color beams passing through the first fly eye lens 131 are converted into divergent light and are incident on the second fly eye lens 135 in a combined state. The second fly eye lens 135 converts the incident beam into parallel light.

The parallel color beams passing through the first and second fly eye lenses 131 and 135 are incident at different locations on the light valve 140 by the relay lens 137, thereby forming color bars. The relay lens 137 may be constituted of a single lens as shown in FIG. 11, or the relay lens 137 may be constituted of a lens group including two or more lenses.

In a case where the first and second fly eye lenses 131 and 135 and the relay lens 137 are provided, light condensed by the spiral lens 110 is transferred by the first and second fly eye lenses 131 and 135 in a one-to-one correspondence and individual color bars are formed on the light valve 140 by the relay lens 137.

The light valve 140 controls the color beams irradiated, for example, in a form of R, G, and B color bars according to an input image signal, thereby forming a color image.

The R, G, and B color bars formed on the light valve 140 are scrolled according to the rotation of the spiral lens 110. Thus, the light valve 140 processes image information for each pixel to synchronize with the movement of the R, G, and B color bars, thereby forming a color image. The color image formed by the light valve 140 is magnified by a projecting lens unit (not shown) and lands on a screen (not shown).

The single-panel color image display apparatus according to the third embodiment of the present invention is shown to further include optional first and second cylindrical lenses 105 and 107 which are disposed in front of and behind the spiral lens 110, respectively, so as to adjust a width of the light 1a incident on the spiral lens 110.

To increase optical efficiency, the major axis direction of the elliptical or near-elliptical light 1a emitted from the illuminating optical system 30 is in line with the longitudinal direction of the first cylindrical lens 105.

The first cylindrical lens 105 reduces the width of the light 1a emitted from the illuminating optical system 30 so that the light 1a with the reduced width is incident on the spiral lens 110. The second cylindrical lens 107 returns the reduced width of the light 1a passing through the spiral lens 110 to its original width.

Figure 14:
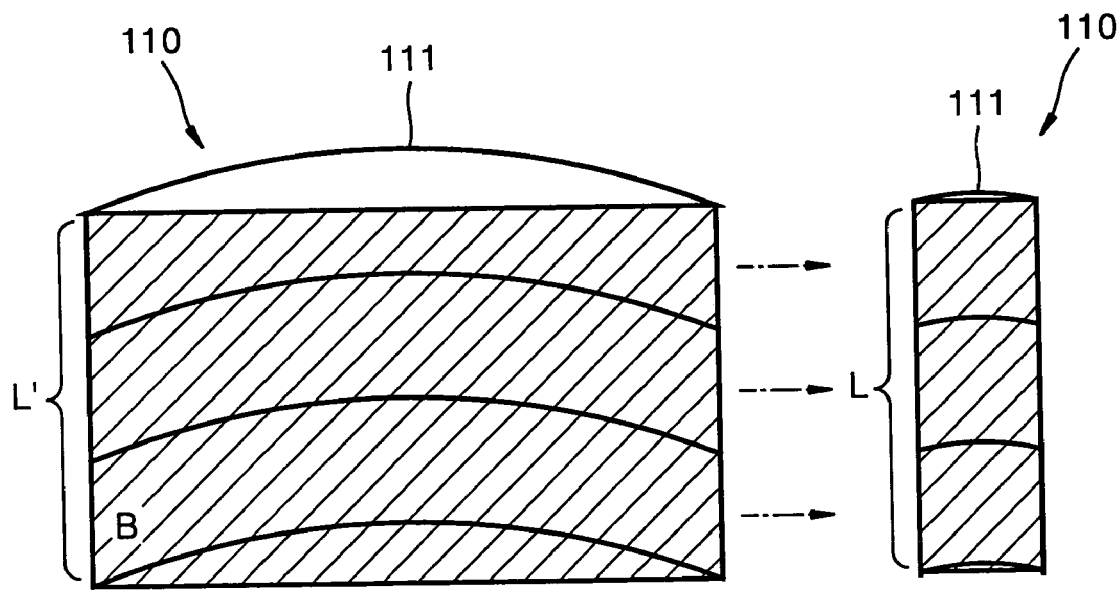
FIG. 14 is a diagram comparing a width of a beam that is emitted from a light source and incident on a spiral lens without passing through a first cylindrical lens with a width of a beam that has been reduced by passing through the first cylindrical lens and then is incident on the spiral lens of FIG. 12.

Referring to FIG. 14, the light 1a which is emitted from the illuminating optical system 30 and incident on the spiral lens 110 without passing through the first cylindrical lens 105 is compared to the light 1a which is emitted from the illuminating optical system 30, has a width reduced by the first cylindrical lens 105 and then is incident on the spiral lens 110.

As shown in a left portion of FIG. 14, when a width of a light beam L' which is emitted from the illuminating optical system 30 and incident on the spiral lens 110 without passing through the first cylindrical lens 105 is relatively wide, the shape of the light beam L' does not match the shape of the lens cells well due to the spiral shape of the lens cells 111 of the spiral lens 110, and thus, light loss is caused.

As shown in a right portion of FIG. 14, when a width of a light beam L is reduced using the first cylindrical lens 105, the light beam L with the reduced width passes through the spiral lens 110 so that the shape of the light beam L nearly matches the spiral shape of the lens cells 111 of the spiral lens 110, thereby reducing light loss.

As described above, since a width of beam can be adjusted using the two cylindrical lenses 105 and 107, light loss can be reduced.

As described above, since a divergent direction of light emitted from a lamp light source can be adjusted at least partly using a reflecting mirror device in which reflecting mirror arrays are formed in at least a portion, an illuminating optical system can effectively match other optical components of a projection type image display apparatus using the same, thereby increasing the optical efficiency of the projection type image display apparatus.

Although a few embodiments of the present invention have been shown and described, the present invention is not limited to the disclosed embodiments. Rather, it would be appreciated by those skilled in the art that changes may be made in this embodiment without departing from the principles and spirit of the invention, the scope of which is defined by the claims and their equivalents.

What is claimed is:

1. An image display apparatus comprising:
   an illuminating optical system including a lamp light source which emits light and a reflecting mirror device having double reflecting mirror arrays formed in at least a portion of the reflecting mirror device for at least partly adjusting a divergent direction of the light emitted from the lamp light source;
   a spiral lens in which lens cells are formed spirally to obtain the effect of a rectilinear motion of a lens cell array due to a rotation of the spiral lens cell array so that a scrolling operation of the adjusted light;
   a light valve which controls the light emitted from the lamp light source and then reflected by the reflecting mirror device on a pixel-by-pixel basis according to an input image signal and forms a color image; and
   a colored light separator which separates the scrolling light according to wavelength,
   wherein the colored light separator includes three or more dichroic filters.

2. The image display apparatus of claim 1, wherein the reflecting mirror device adjusts the divergent direction of the light emitted from the lamp light source so that the light is converted into elliptical or near-elliptical light.

3. The image display apparatus of claim 2, wherein an angle of a mirror surface of the double reflecting mirror arrays is 45°.

4. The image display apparatus of claim 1, wherein an angle of a mirror surface of the double reflecting mirror arrays is 45°.

5. The image display apparatus of claim 1, further comprising first and second fly eye lenses disposed between the spiral lens and the light valve and which send light passing through the spiral lens to match the lens cells of the spiral lens in a one-to-one correspondence.

6. The image display apparatus of claim 5, further comprising a relay lens disposed between the second fly eye lens and the light valve and which condenses light passing through the second fly eye lens onto the light valve according to color.

7. A projection system comprising:
an illuminating optical system including a light source which emits a light beam and is disposed at a light emitting end of a light path and a light shape adjuster disposed on the light path which adjusts the shape of the light beam emitted by the light source so as to output a shape adjusted light beam;
a light valve which forms a color image by turning pixels one of on and off according to an input image signal, the light valve disposed at an image forming end of the light path;
a scrolling unit disposed on the light path between the illuminating optical device and the light valve, the scrolling unit receiving the shape adjusted light beam and scrolling the shape adjusted light beam;
a colored light separator which separates the shape adjusted light beam emitted from the scrolling unit into color beams according to wavelength; and
a pair of fly-eye lenses disposed on the light path between the colored light separator and the light valve which receive the scrolling color beams and focus the color beams onto a relay lens disposed on the light path between the pair of fly-eye lenses and the light valve and transmits to the light valve received color beams from the pair of fly-eye lenses,
wherein the scrolling causes the color beams to be received by the light valve at different portions of the light valve.

8. The illuminating optical system of claim 7, wherein the light generating section comprises a parabolic mirror and emits at least substantially parallel light.

9. The illuminating optical system of claim 7, wherein the light beam has a substantially circular cross-section and the shape adjusted light beam has a substantially elliptical cross-section.

10. The projection system of claim 7, wherein the color light separator includes first through third dichroic filters which are inclined at different angles with respect to incident light, split the incident light according to wavelength ranges, and advance the color beams at least substantially parallel paths.

11. The projection system of claim 10, wherein the first through third dichroic filters separate incident light into red, green and blue light, respectively.

12. The projection system of claim 11, wherein the first through third dichroic filters are spaced so that separated red, green, and blue light are incident on the same lens cell of the first fly eye lens without mixing.

13. The projection system of claim 7, wherein the scrolling unit is a rotatable spiral lens having an array of lens cells spirally formed thereon and which, when the scrolling unit is rotated, simulate rectilinear motion of the scrolling unit.

14. The projection system of claim 13, wherein the scrolling unit is rotated at a constant speed in a direction.

15. The projection system of claim 13, wherein an increase in one of the number of cylinder lens cells and the rotational speed of the scrolling unit increases the scrolling speed.

16. The projection system of claim 13, wherein a decrease in one of the number of cylinder lens cells and the rotational speed of the scrolling unit decreases the scrolling speed.

17. The projection system of claim 7, wherein a scrolling speed of the scrolling unit is synchronized with an operating frequency of the light valve.

18. The projection system of claim 7, wherein the scrolling unit is a single optical element.

19. The projection system of claim 7, wherein the first and second fly-eye lenses have a plurality of 2 dimensionally arranged lens cells.

20. A method of displaying an image, comprising:
emitting a light beam;
adjusting a divergent angle of the light beam so as to adjust a shape thereof by directing the light beam onto a reflecting mirror having double reflecting mirror arrays and reflecting at least a portion of the light beam off of the double reflecting mirror arrays;
passing the light beam through a rotating spiral lens in which lens cells are formed spirally to obtain the effect of a rectilinear motion of a lens cell array due to a rotation of the spiral lens cell array so as to scroll the shape adjusted light beam;
controlling the reflected light beam on a pixel-by-pixel basis according to an input image signal and forming a color image;
separating the emitted light beam into plural colored light beams according to wavelength; and
projecting the magnified color image onto a screen,
wherein the colored light separator includes three or more dichroic filters.

21. A method of displaying an image, comprising:
emitting a light beam from a light emitting end of a light path;
adjusting a divergent angle of the light beam so as to adjust a shape thereof;
forming, via a light valve disposed at an image forming end of the light path, a color image by turning pixels one of on and off according to an input image signal;
scrolling the shape adjusted light beam, the scrolling executed on the light oath between the light emitting end and the light valve;
separating the scrolling and shape adjusted light beam into a plurality of scrolling color beams according to wavelength;
focusing, via a pair of fly-eye lenses, the separated, scrolling color beams and focusing the separated, scrolling color beams onto a relay lens disposed between the pair of fly-eye lenses and the light valve and which transmits to the light valve received color beams from the pair of fly-eye lenses; and
projecting the magnified color image onto a screen,
wherein the scrolling causes the color beams to be received by the light valve at different portions of the light valve.

* * * * *

UNITED STATES PATENT AND TRADEMARK OFFICE
CERTIFICATE OF CORRECTION

PATENT NO. : 7,298,556 B2
APPLICATION NO. : 10/654614
DATED : November 20, 2007
INVENTOR(S) : Kun-ho Cho et al.

It is certified that error appears in the above-identified patent and that said Letters Patent is hereby corrected as shown below:

Title Page, Column 1 item 75 (Inventors), Line 3, change "Cyconggi-do" to --Gyeonggi-do--.

Title Page, Column 1 item 75 (Inventors), Line 4, change "Cyconggi-do" to --Gyeonggi-do--.

Column 12, Line 46, change "light:" to --light;--.

Column 14, Line 45, change "oath" to --path--.

Signed and Sealed this

Sixth Day of May, 2008

JON W. DUDAS
*Director of the United States Patent and Trademark Office*